United States Patent
Pfaff et al.

(10) Patent No.: US 11,997,280 B2
(45) Date of Patent: May 28, 2024

(54) USE-CASE DRIVEN CONTEXT MODEL SELECTION FOR HYBRID VIDEO CODING TOOLS

(71) Applicant: Fraunhofer-Gesellschaft zur Förderung der angewandten Forschung e.V., Munich (DE)

(72) Inventors: Jonathan Pfaff, Berlin (DE); Philipp Helle, Berlin (DE); Michael Schäfer, Berlin (DE); Tobias Hinz, Berlin (DE); Björn Stallenberger, Berlin (DE); Philipp Merkle, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 324 days.

(21) Appl. No.: 17/460,996

(22) Filed: Aug. 30, 2021

(65) Prior Publication Data
US 2021/0392331 A1    Dec. 16, 2021

Related U.S. Application Data

(63) Continuation of application No. PCT/EP2020/055732, filed on Mar. 4, 2020.

(30) Foreign Application Priority Data

Mar. 5, 2019    (EP) .................................... 19160705

(51) Int. Cl.
H04N 19/13    (2014.01)
H04N 19/176    (2014.01)
(Continued)

(52) U.S. Cl.
CPC ........... *H04N 19/13* (2014.11); *H04N 19/176* (2014.11); *H04N 19/46* (2014.11); *H04N 19/70* (2014.11)

(58) Field of Classification Search
CPC ...... H03M 7/4018; H04N 19/13; H04N 19/21
See application file for complete search history.

(56) References Cited

U.S. PATENT DOCUMENTS

| | | |
|---|---|---|
| 6,370,276 B2 | 4/2002 | Boon |
| 6,459,813 B1 | 10/2002 | Boon |

(Continued)

FOREIGN PATENT DOCUMENTS

| | | |
|---|---|---|
| TW | 395136 B | 6/2000 |
| WO | 2013/106674 A2 | 7/2013 |
| WO | 2019/009503 A1 | 1/2019 |
| WO | 2019/029951 A1 | 2/2019 |

OTHER PUBLICATIONS

ISO/IEC, ITU-T. High efficiency video coding. ITU-T Recommendation H.265 | ISO/IEC 23008 10 (HEVC), edition 1, Apr. 2013.
(Continued)

*Primary Examiner* — Clifford Hilaire
(74) *Attorney, Agent, or Firm* — Conley Rose, P.C.

(57) ABSTRACT

An apparatus includes an encoder, which receives image or video data, encodes the data and provides a bitstream representing the data. The encoder includes a CABAC encoder, which receives a binary valued syntax element associated with a block of the data to be encoded, and encodes, using a selected context model, the syntax element into coded bits for the bitstream. The syntax element includes a tool flag indicating whether or not certain coding tool, like linear weighted intra prediction, is employed when encoding a block of the data. For a block of the data which exhibits an aspect ratio larger than 2 and for a block of the data which exhibits an aspect ratio less than or equal to 2, (Continued)

and to which blocks the certain coding tool is applicable, first and second context models for encoding the tool flag are selected from a group of one or more first and second context models, respectively.

17 Claims, 3 Drawing Sheets

(51) Int. Cl.
*H04N 19/46* (2014.01)
*H04N 19/70* (2014.01)

(56) References Cited

U.S. PATENT DOCUMENTS

| | | | |
|---|---|---|---|
| 6,633,678 | B2 | 10/2003 | Boon |
| 2020/0396488 | A1* | 12/2020 | Koo ........................ H04N 19/13 |
| 2021/0006803 | A1* | 1/2021 | Zhang ................... H04N 19/109 |
| 2021/0105499 | A1* | 4/2021 | Lee ....................... H04N 19/159 |
| 2021/0243429 | A1* | 8/2021 | Lee ....................... H04N 19/176 |
| 2021/0306654 | A1* | 9/2021 | Lee ......................... H04N 19/70 |
| 2022/0046232 | A1* | 2/2022 | Piao ..................... H04N 19/105 |

OTHER PUBLICATIONS

ISO/IEC, ITU-T. High efficiency video coding. ITU-T Recommendation H.265 | ISO/IEC 23008 10 (HEVC edition 2, Oct. 2014.

JEM Reference Software, https://jvet.hhi.fraunhofer.de/svn/svn_HMJEMSoftware/ Oct. 29, 2020.

B. Bross et al., "Versatile Video Coding (Draft 3)", Joint Video Experts Team (JVET) of ITU-T SG 16 WP3 and ISO/IEC JTC 1/SC29/WG 11, 12 Meeting: Macao, CN, Document: JVET_L1001-v9, XP30212940, Oct. 3-12, 2018.

Jonathan Pfaff et al., "CE3: Affine linear weighted intra prediction (test 1.2.1, test 1.2.2)", No. JVET-M0043, (Jan. 9, 2019), 13. JVET Meeting; Jan. 9, 2019-Jan. 18, 2019; Marrakech; (The Joint Video Exploration Team of ISO/IEC JTC1/SC29/WG11 and ITU-T SG.16), URL: http:/phenix.int-evry.fr/jvet/doc_end_user/documents/13_Marrakech/wg11/JVET-M0043-v2.zip JVET-M0043_v1.docx, (Jan. 9, 2019), XP030200985 [A] 1-7 * sections 1-2, Jan. 9-18, 2019.

Pfaff J et a, "CE3: Affine linear weighted intra prediction (test 1.2.1, test 1.2.2)", No. M45292, (Jan. 9, 2019), 125. MPEG Meeting; Jan. 14, 2019-Jan. 18, 2019; Marrakech; (Motion Picture Expert Group or ISO/IEC JTC1/SC29/WG11),, URL: http://phenix.int-evry.fr/mpeg/doc_end_user/documents/125_Marrakech/wg11/m45292-JVET-M0043-v2-JVET-M0043_v2.zip JVET-L1001-v9_proposal_text_v1. docx, (Jan. 9, 2019), XP030212940 [A] 1-7 * section 8.3.X * * p. 225; tables 9-10.

B. Bross et al., "Versatile Video Coding (Draft 8)", JVET-Q2001-vE, Joint Video Experts Team (JVET) of ITU-T SG 16 WP 3 and ISO/IEC JTC 1/SC 29/WG 11, 17th Meeting: Brussels, BE, Jan. 7-17, 2020.

B. Bross et al., "Versatile Video Coding (Draft 4)", JVET-M1001-v5, Feb. 2019, Marrakesh, Morocco—13th Meeting: Marrakech, MA, Document: JVET-M1001-v54, Jan. 9-18, 2019.

* cited by examiner

USE-CASE DRIVEN CONTEXT MODEL SELECTION FOR HYBRID VIDEO CODING TOOLS

CROSS-REFERENCES TO RELATED APPLICATIONS

This application is a continuation of copending International Application No. PCT/EP2020/055732, filed Mar. 4, 2020, which is incorporated herein by reference in its entirety, and additionally claims priority from European Application No. EP 19160705.0, filed Mar. 5, 2019, which are incorporated herein by reference in their entirety.

The present invention relates to the field of encoding/decoding pictures, images or videos, more specifically, to the encoding of one or more coding tools, like an affine linear weighted intra prediction, LWIP, or matrix-based intra prediction, MIP, of the versatile video coding, VVC, standard, using context or context modes of a context adaptive binary arithmetic coding, CABAC, engine. Embodiments concern the encoding of a flag, like the intra_mip_flag, indicating the applicability of the LWIP or MIP of the VVC standard based on context models selected dependent on an aspect ratio of a block of the image or video data to be processed.

BACKGROUND OF THE INVENTION

In state-of-the-art video coding standards like ITU T H.265|MPEG H HEVC [1], pictures are divided into CodingTreeUnits of fixed square size that can further be sub-partitioned into smaller blocks. The reconstructed signal of such a block is usually a superposition of a prediction signal and a residual signal. The prediction signal is obtained either by extrapolation of samples of the adjacent neighborhood into the current block (intra prediction) or by copying a filtered or unfiltered representation of samples from one or two reference pictures (inter prediction). Reference pictures are pictures that have already been reconstructed from the bitstream and that are stored for reference in a picture buffer.

The residual signal is obtained by inverse transforming dequantized transform coefficients that are read from the bitstream. After the block reconstruction process, in-loop filters are applied to enhance the signals of the reconstructed blocks and to obtain the reconstructed picture.

The entropy decoding process of reading symbols like transform coefficients, deltaQP, intra prediction mode, motion vector differences etc. from the bitstream is done by a parser that uses a context adaptive binary arithmetic coding (CABAC) engine to convert bits read from the bitstream into binary decisions (bins). The parser converts or combines these bins into the symbols or syntax elements. The adaptivity of the entropy coding process is realized by using CABAC Contexts (CCs). Each context represents an adaptive probability model, which models the entropy of a specific symbol or sets of symbols. The term adaptive indicates a permanent update of the model towards the current coded state. Thus, the model adapts to local statistics of the corresponding symbols. The update step is usually embedded in the arithmetic coding operation. First, the current state of the CC is used to parameterize the arithmetic coding process. Then, once the decoded symbol is derived, it is used to update the CC with a given step size towards the current decoded probability.

In the JEM-Software [2] as well as in the upcoming VVC-Standard [3], various improvements concerning the arithmetic coding process have been evaluated and have been adopted. The arithmetic coding engine has been changed and also the initialization and update process of the CCs have been improved. The dynamic range of the probability representation as well as the behavior of the update process of CCs have been refined. Each CC has an individual two-level update step that controls the adaption-strength of the CC towards the current probability. This improvement helps to customize the CC update process according to the expected CC usage statistics.

Due to the high number of binary decisions that may be used to transmit syntax elements and because of the number of the syntax elements as such, binary decisions have to be grouped using the same CC in order to reach a practical number or amount of CCs that can be handled by a decoder. Furthermore, the grouping helps the update process to exploit local statistics and it improves the stability of the underlying probability models.

The binary decisions with statistically similar probabilities that belong to the same syntax element are usually grouped into one CC. Exceptions of this kind of grouping are made in the case when a binary decision is likely to have different probabilities that can be predicted from already decoded symbols in the adjacent neighborhood. In this case, the chosen CC is predicted from already decoded symbols in the adjacent neighborhood. Such a procedure is usually applied to symbols that are transmitted in the bitstream rather frequently.

Besides the context controlled arithmetic coding, there is a bypass mode with a fixed probability of 0.5. This bypass mode, incorporated in the arithmetic coder, is a low-complexity mode for high throughput. The bypass mode is extensively used for transform coding for example.

SUMMARY

According to an embodiment, an apparatus may have: an encoder, the encoder to receive image or video data, to encode the received image or video data and to provide a bitstream representing the image or video data, the encoder including a CABAC encoder, the CABAC encoder to receive a binary valued syntax element associated with a block of the image or video data to be encoded, and to encode, using a selected context model, the binary valued syntax element into coded bits for the bitstream, wherein the binary valued syntax element includes a tool flag indicating whether or not certain coding tool, like a linear weighted intra prediction, LWIP, is employed when encoding a block of the image or video data, wherein, for a block of the image or video data having an aspect ratio larger than 2 and to which the certain coding tool is applicable, a first context model for encoding the tool flag is selected from a group of one or more first context models, wherein, for a block of the image or video data having an aspect ratio less than or equal to 2 and to which the certain coding tool is applicable, a second context model for encoding the tool flag is selected from a group of one or more second context models.

According to another embodiment, an apparatus may have: a decoder, the decoder to receive a bitstream including encoded image or video data, to decode from the received bitstream the encoded image or video data and to provide the decoded image or video data, the decoder including a CABAC decoder, the CABAC decoder to decode from the bitstream, using a selected context model, a binary valued syntax element associated with a block of the encoded image or video data, wherein the binary valued syntax element includes a tool flag indicating whether or not a certain coding tool, like a linear weighted intra prediction, LWIP, is employed when encoding a block of the image or video data, wherein, for a block of the image or video data having an aspect ratio larger than 2 and to which the certain coding tool is applicable, a first context model for decoding the tool flag is selected from a group of one or more first context models, wherein, for a block of the image or video data having an aspect ratio less than or equal to 2 and to which the certain coding tool is applicable, a second context model for decoding the tool flag is selected from a group of one or more second context models.

According to another embodiment, a method for encoding image or video data may have the steps of: receiving image or video data, encoding the received image or video data, and providing a bitstream representing the image or video data, wherein encoding the received image or video data may have the steps of: receiving, using a CABAC encoder, a binary valued syntax element associated with a block of the image or video data to be encoded, and encoding, using a selected context model, the binary valued syntax element into coded bits for the bitstream, wherein the binary valued syntax element includes a tool flag indicating whether or not certain coding tool, like a linear weighted intra prediction, LWIP, is employed when encoding a block of the image or video data, wherein, for a block of the image or video data having an aspect ratio larger than 2 and to which the certain coding tool is applicable, a first context model for encoding the tool flag is selected from a group of one or more first context models, wherein, for a block of the image or video data having an aspect ratio less than or equal to 2 and to which the certain coding tool is applicable, a second context model for encoding the tool flag is selected from a group of one or more second context models.

According to yet another embodiment, a method for decoding image or video data may have the steps of: receiving a bitstream including encoded image or video data, decoding from the received bitstream the encoded image or video data, and providing the decoded image or video data, wherein decoding the received image or video data includes decoding from the bitstream, using a CABAC decoder and a selected context model, a binary valued syntax element associated with a block of the encoded image or video data, wherein the binary valued syntax element includes a tool flag indicating whether or not a certain coding tool, like a linear weighted intra prediction, LWIP, is employed when encoding a block of the image or video data, wherein, for a block of the image or video data having an aspect ratio larger than 2 and to which the certain coding tool is applicable, a first context model for decoding the tool flag is selected from a group of one or more first context models, wherein, for a block of the image or video data having an aspect ratio less than or equal to 2 and to which the certain coding tool is applicable, a second context model for decoding the tool flag is selected from a group of one or more second context models.

According to yet another embodiment, a non-transitory digital storage medium may have a computer program stored thereon to perform the inventive methods, when said computer program is run by a computer.

According to still another embodiment, an apparatus may have: an encoder, the encoder to receive image or video data, to encode the received image or video data and to provide a bitstream representing the image or video data, the encoder including a CABAC encoder, the CABAC encoder to receive a binary valued syntax element associated with a certain data block of the image or video data to be encoded, to encode, using a selected context model, the binary valued syntax element into coded bits for the bitstream, wherein the binary valued syntax element includes a tool flag indicating whether or not a certain coding tool is employed when encoding the image or video data, wherein a group of first context models for encoding the tool flag is selected for one or more first parts of the certain data block to which, independent of an application, the coding tool is typically applicable, wherein a group of second context models for encoding the tool flag is selected for one or more second parts of the certain data block to which, dependent on the application, the coding tool is applicable or is not applicable.

According to another embodiment, an apparatus may have: a decoder, the decoder to receive a bitstream including encoded image or video data, to decode from the received bitstream the encoded image or video data and to provide the decoded image or video data, the decoder including a CABAC decoder, the CABAC decoder to decode from the bitstream, using a selected context model, a binary valued syntax element associated with a certain data block of the encoded image or video data, wherein the binary valued syntax element includes a tool flag indicating whether or not a certain coding tool is employed when encoding the image or video data, wherein a group of first context model for decoding the tool flag is selected for parts of the certain data block to which, independent of an application, the coding tool is typically applicable, wherein a group of second context model for decoding the tool flag is selected for parts of the certain data block to which, dependent on an application, the coding tool is applicable or is not applicable.

The evolution of video coding methods has shown an increasing variety of block shapes and an increasing number of coding tools, leading to a considerable amount of algorithmic complexity at the encoder to find a good coded representation. Thus, it can be beneficial at the encoder to skip evaluation of (i.e. switch off) a coding tool in certain contexts to achieve a better complexity versus compression efficiency trade off. The usage of a coding tool on a block is usually communicated to the decoder by submitting context modeled tool-enable-flags in the bitstream.

PROBLEM

Ideally, a decoder has a minimum of constraints on whether a tool enable flag, i.e. a flag that determines whether a tool like e.g. a coding mode or a prediction mode is applied to a certain block or not, is sent in the bitstream or not. The reason is that disabling a tool for certain cases may deteriorate its impact on the compression performance in some scenarios, even if these scenarios are rather unlikely. In fact, one of the main reasons of the efficiency of hybrid video codecs is that a very large variety of competing coding tools are typically possible and only one of these tools is selected in a given case.

For instance, a constraint on allowing a tool, and thus sending the tool enable flag, only for small block sizes, would potentially decrease the coding efficiency of future applications with very high resolutions that usually contain only a small portion of small blocks.

On the other hand, sending a tool enable flag for all possible cases is inefficient for application scenarios where a fast encoder search strategy would not test the tool for some cases because for these cases the tool is unlikely to be chosen either because it is too expensive in terms of run time or the effect of using the tool in these cases on the overall coding efficiency is rather small. In such a setting, not testing the tool for certain cases would lead to a faster encoder, but for the price of a somewhat decreased coding efficiency: A tool enable flag would be sent in the bitstream for a certain case, although the tool is never used for that case in the given scenario. Thus, in this scenario, the coding efficiency would be higher if the encoder search constraint would also be represented by a constraint on sending the tool enable flag in the bitstream.

Starting from conventional technology as described above, there may be a need for improvements or enhancements for encoding of one or more coding tools used for encoding/decoding pictures, images or videos

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention are now described in more detail with reference to the accompanying drawings, in which the same or similar elements have the same reference signs assigned.

As mentioned above, in the design on how to group binary decisions into context models, only the aspect of lowering the overall entropy vs. the number of used context models has been taken into account in previous standards. In contrast to this approach, a new aspect for the design on how to group binary decisions into context models is raised in accordance with the present invention. This approach takes into account the increasing complexity of algorithms as such. The present invention adapts the context modeling, e.g. by inserting contexts, in order to align coding contexts with contexts that are suited to switch off certain coding tools. This enables encoders to choose among operating points with different algorithmic complexity while avoiding deterioration of compression efficiency.

The inventive approach is explained using the following example. It is assumed that a probability modeled binary decision switches between a first tool represented by algorithm 1 and a second tool represented by algorithm 2. Here, the second tool is thought to be a baseline tool while the first one is thought to be a more special tool. In accordance to this assumption, the second tool is overall more likely to be chosen than the first one. As an example, it is assumed that the overall probability that the first tool is preferred over the second tool is 0.3.

Now it is assumed that two application scenarios are given. In the first application A, there are N cases where both tools are tested and the best performing one is chosen. In the second application B, for some reason, only for a determined portion of all N cases both tools are tested and for the remaining cases, only the baseline tool, i.e. the second tool, is chosen. For both applications, the decisions for all N cases have to be context modeled and to be transmitted in the bitstream. It is assumed, as an example, that the number of cases where both tools are tested in application B is equal to N/2. For the other N/2 cases, the tool is tested in application A but not tested in application B.

If the tool flag is context coded with a single CC, in the first application A, the probability of algorithm 1 has a stable value of 0.3, whereas in the second application B, its average probability drops to 0.15, introducing a fixed probability penalty of ±0.15 for all N cases: In the cases, where the tool is tested in application B, the true probability would be 0.3 instead of 0.15 while in the cases where the tool is not tested in application B, the true probability would be 0. In other words, in application B, using a single CC, the probability of the actual decisions would be modeled in a non-optimal way leading to higher bitrate when transmitted in the bitstream.

In the inventive approach, the disadvantage of such a non-optimal modeling of the probability of the decision is overcome as follows. Instead of using one probability model for all decisions, two (or more) probability models resp. CABAC contexts are assigned to the same decision. Which of the probability models is used for each of the N cases is selected with a selection index.

When considering again the above example, the selection index is chosen in such a way that it distinguishes between the determined portion where algorithm1 and algorithm 2 are tested and the remaining portion where only algorithm 2 is tested in the second application B. In other words, the two different case are clustered, and represented by a different value of the selection index.

When using this selection index with two probability models in application A, several different CCs can still model the statistics of the tool flag, although the selection index switches between two probability models. In both models, the tool represented by algorithm 1 has a probability of 0.3. This leads to an equivalent modeling as in the original case, which was modeled with only one probability model.

However, using the aforementioned selection index with two probability models in the second application B causes an optimal modeling for this case too. For the determined portion of all the N/2 cases where both algorithms are tested, the probability of algorithm 1 is 0.3 and for the remaining portion that only tests the baseline algorithm 2, the probability of algorithm 1 is 0.0. Both probabilities are captured in a well distinguished way in the two probability models, thus yielding a modeling without any modelling penalty resulting in a low bitrate when transmitted in the bitstream.

Thus, embodiments of the inventive approach is based on introducing an additional CABAC context for sending the tool enable flag. This extra context is only applied if a condition is met. Otherwise, the CABAC context is selected as usual. In accordance with an embodiment, the condition could be that the size of current block belongs to a predefined subset of block sizes that might be skipped by a fast encoder search strategy, but that might be beneficial for applications that involve a high coding efficiency. In accordance with another embodiment, the condition could be that the aspect ratio of a current block is above a certain value, like 2, that might be skipped by a fast encoder search strategy, but that might be beneficial for applications that involve a high coding efficiency and that may be controlled on a block-level rather than on a picture-level or slice-level.

On the one hand, due to the probability adaptation of a CABAC context, if in an application scenario the tool is never tested for specific cases defined by the condition, the signaling overhead for sending the tool flag for these cases will be very small. Thus, the coding efficiency will be almost as good as if the tool flag would not be sent for these cases.

On the other hand and again due to the probability adaptation of CABAC contexts, if in a different application scenario the tool is tested by an encoder also in the cases determined by the condition, the coding efficiency for sending the tool flag will not decrease significantly if a separate CABAC context is used for the cases determined by the condition.

Thus, in contrast to state of the art approaches, the assignment of different CABAC contexts as proposed by the present invention is not guided by attempting to model the overall conditional probability distribution of the tool flag. Instead, as explained by the above example, the assignment of different CABAC Contexts corresponds to different application scenarios of a tool. Here, each application scenario is defined as a specific condition under which the execution of the given tool would in principle be possible but would never be tested by the encoder in the given scenario.

There can be different reasons for excluding tools resp. algorithms under specific conditions, and below some embodiments of the cases determined by the conditions are given but the present invention is not limited to these embodiments. First, the excluded algorithm may be too complex for these cases. Second, the algorithm may not be implemented or even not be implementable for these cases for example due to hardware or resource limitations. Third, there are scenarios in which the algorithm used in these cases may only marginally improve the compression performance. Fourth, using the underlying algorithm in these cases basically typically gives very limited compression benefit and is thus feasible only if maximal compression performance is targeted. Fifth, these cases do not comprise the core application field the algorithm resp. the tool was initially designed for.

More than One Context Split for a Tool

Embodiments of present invention also incorporate the splitting of a context into a variety of contexts, where each of the additional contexts corresponds to different use case scenarios for the underlying tool. An embodiment for this specification could be as follows. An original or convention tool enable flag is modeled by a single context. In accordance with embodiments, the inventive approach uses three contexts instead where the selection index is controlled for example by quantized versions of the block area. Here, the selection index might be assigned as follows:

0|(block_area>=max_block_area/4),
SelectionIndex=1|(block_area>=max_block_area/16) AND (block_area<max_block_area/4),
2|otherwise.

In accordance with other embodiments, the inventive approach uses four contexts or context models for the binarization of a syntax element intra_mip_flag representing an affine linear weighted intra prediction, LWIP, or matrix-based intra prediction, MIP, of the versatile video coding, VVC, standard. The selection index is controlled by the aspect ratio (width/height or height/width) of a current block:

0|otherwise,
1|otherwise,
SelectionIndex=2|otherwise,
3|if an aspect ratio of a current block is larger than 2

Figure 1:
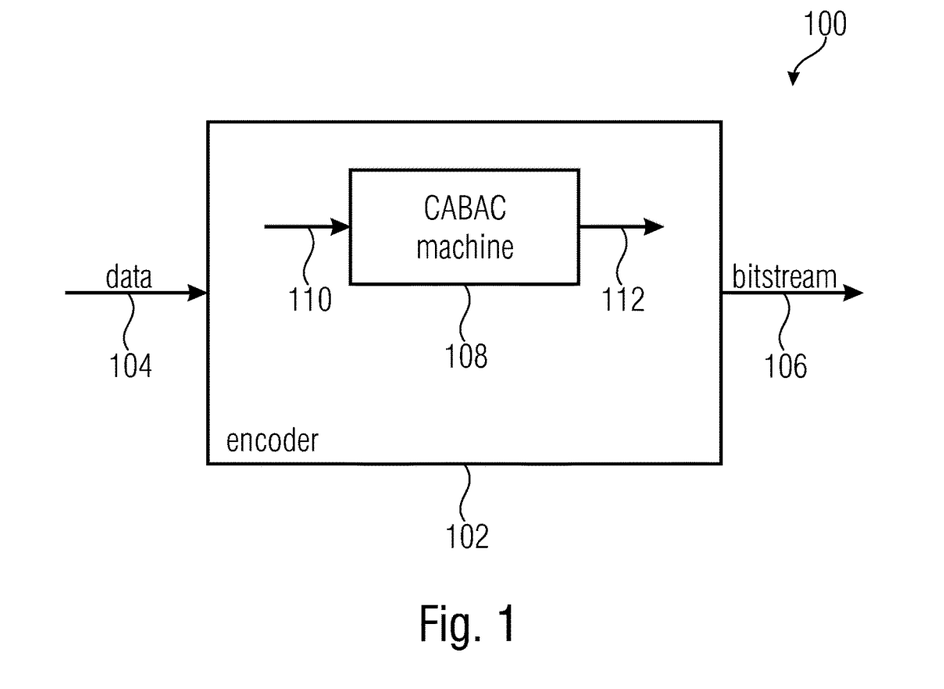
FIG. 1 illustrates an apparatus for encoding image or video data in accordance with embodiments of the present invention.

FIG. 1 illustrates an apparatus 100 for encoding image or video data in accordance with embodiments of the present invention. The apparatus 100 includes an encoder 102. The encoder 102 receives image or video data 104 and encodes the received image or video data 104 so as to provide a bitstream 106 representing the encoded image or video data. The encoder 102 includes a CABAC encoder 108. The CABAC encoder 108 receives a binary valued syntax element 110 associated with a certain data block of the image or video data to be encoded and encodes, using a selected context model, the binary valued syntax element into coded bits 112 for the bitstream. The binary valued syntax element includes a tool flag indicating whether or not a certain coding tool is employed when encoding the image or video data. A group of first context models for encoding the tool flag is selected for one or more first parts of the certain data block to which, independent of an application, the coding tool is typically applicable. A group of second context models for encoding the tool flag is selected for one or more second parts of the certain data block to which, dependent on the application, the coding tool is applicable or is not applicable. In accordance with embodiments, as also described below, the CABAC encoder 108 selects the first context model or the second context model for a currently processed part of the certain data block responsive to a selection index. The selection index has a first value indicating that the currently processed part of the certain data block is the first part, and the selection index has a second value indicating that the currently processed part of the certain data block is the second part.

Figure 2:
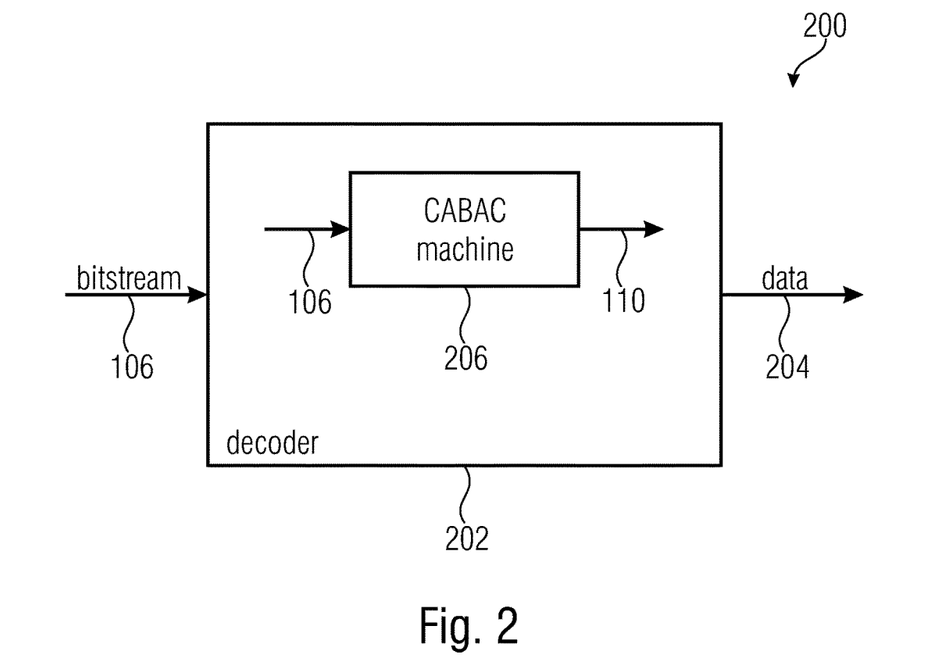
FIG. 2 illustrates an apparatus for decoding encoded image or video data in accordance with embodiments of the present invention.

FIG. 2 illustrates an apparatus 200 for decoding encoded image or video data in accordance with embodiments of the present invention. The apparatus 200 includes a decoder 202. The decoder 202 receives a bitstream 106, like the bitstream provided by the encoder 102 in FIG. 1. The bitstream 106 includes the encoded image or video data, and the decoder 202 decodes from the received bitstream the encoded image or video data and provides the decoded image or video data 204. The decoder includes a CABAC decoder 206 which decodes from the bitstream 106, using a selected context model, the binary valued syntax element 110 associated with a certain data block of the encoded image or video data. The binary valued syntax element includes a tool flag indicating whether or not a certain coding tool is employed when encoding the image or video data. A group of first context model for decoding the tool flag is selected for parts of the certain data block to which, independent of an application, the coding tool is typically applicable, and a group of second context model for decoding the tool flag is selected for parts of the certain data block to which, dependent on an application, the coding tool is applicable or is not applicable. In accordance with embodiments, as also described below, the CABAC decoder 206 selects the first context model or the second context model for a currently processed part of the certain data block responsive to a selection index. The selection index has a first value indicating that the currently processed part of the certain data block is the first part, and the selection index has a second value indicating that the currently processed part of the certain data block is the second part.

In accordance with embodiments, the group of first context models includes one first context model or a variety of first context models, and the group of second context models includes one second context model or a variety of second context model.

Combination with Original Context Indexing

As mentioned before, in many cases tool enable flags are modeled by more than one context model when a binary decision is likely to have different probabilities that can be predicted from already decoded symbols in the adjacent neighborhood. The inventive approach can also be applied as a combination of such an entropy driven context selection and the inventive selection index. The motivation for such a combination is obvious since the original entropy driven context indexing might also be suitable after a separation.

An embodiment where a context model for a tool flag is selected both by an entropy driven context selection and by the approach of the present invention is as follows.

0|tools is neither used in the block above or in the block left of the current block
EntropyIndex=1|tool is only used in one of the blocks above or left of the current block
    2|tool is used in the block above and in the block left of the current block
SelectionIndex=0|(block_area>=max_block_area/16), 1|otherwise
CombinedIndex=EntropyIndex+3*SelectionIndex.

Thus, in this embodiment, a purely entropy driven context selection would yield three possible context models for a given tool flag while its combination with the context model selection of the present invention yields six possible context models that are indexed by the index CombinedIndex.

Replacement of Bypass Mode Coded Enable Flag

The inventive approach is also applicable for flags that are originally coded using the bypass mode. In such a case either one or two additional context models may be used to realize the use-case driven implementation. If only one additional context model is used, the selection index distinguishes between using the bypass mode for coding the not affected portion of cases and the one context model for all other cases, where the tool can now be switched on and off.

In a case where two context models are used, the bypass mode is entirely replaced by context modeled arithmetic coding and the selection index would distinguish between the two context models. It should be mentioned that with the improved update techniques in the upcoming VVC-standard, the one context that models the not switchable portion of cases could be updated with a small update strength to achieve a quasi stationary model.

It should also be mentioned that the additional model that models a switchable portion of cases would certainly be used with a very strong update-strength to achieve a fast adaption of the context model either towards the tool on or tool off probability.

Alternative Way of Signaling Partial Tool Enabling in a Parameter Set

The aforementioned partial tool enabling behavior can also be signaled in a parameter set that is signaled in the bitstream for each predetermined portion of one or several frames, for example for each slice. In this case, context separation would not be required because the transmitted flags from the parameter set would contain all useful information. However, a disadvantage of this kind of signaling in comparison to a use case driven context model selection is that in the former case, throughout the whole portion of the video sequence for which the parameter set applies, a tool can only be either completely enabled or disabled for the case corresponding to the application scenario while in the latter case, it can also be disabled within any variable portion of the video sequence that does not need to be predetermined resp. known to the decoder. The reason is that in the latter case, if a special context model for a tool flag is assigned to all cases in which for a specific application scenario it is sometimes feasible to disable the tool, then, starting anywhere in the sequential encoding, an encoder corresponding to the specific application scenario could never test the tool for the corresponding cases until a flexible point in the sequential encoding with only minor signalization overhead in comparison to the situation where the tool would be completely forbidden for all cases corresponding to the application scenario in this specific part of the video sequence.

Application with Arbitrary Coding Tools

The inventive context splitting can be applied to any coding tool that is controlled by an enable flag. Current candidate tools occurring in the future VVC standard that could be used with the inventive approach are listed below. However, the application of the inventive approach is not limited to these tools. Candidate tools are DMVR, OBMC, BIO, FRUC, LIC, ISP, ALF, SAO, Inter- or intra MTS, 65 Angular Intra Modes, MRL and also partitioning tools like QTBT, MTT or QTBT+TT.

The inventive approach can also be applied to a tool that has different configurations which are represented by an index value. Here, the CC assignment of the present invention would be determined by the fact that in some application scenarios, only a subset of all configurations of the tool are feasible either for specific cases or in general.

The CC assignment of the present invention would take these different application scenarios into account by assigning extra CCs to the configuration in which the tool is unfeasible for a scenario. An embodiment for this aspect of the present invention would be the tool of applying one out of n transforms for the inverse transform of prediction residuals, where the index of the transform is transmitted in the bitstream.

With the inventive approach at hand, many of the tools could be provided with some context splitting enabling tools only under specific circumstances. Here, the context splitting according to the present invention is in accordance to specific cases under which a specific tool might be unfeasible in certain application scenarios. These specific cases depend on key properties of the tool. A list of the properties that could be evaluated or combined to specific circumstance that does not limit to use cases of this invention is: block size, block shape, block aspect ratio, temporal level, QP, picture type, picture resolution, dynamic range of the picture, reference picture, leading picture of a GOP.

The specific circumstance can also be a combination of those aforementioned properties.

Embodiment of an Application of the Inventive Approach of Context Assignment

Affine Linear weighted intra prediction (LWIP) [4] is a new intra prediction technique. Like conventional intra prediction, LWIP consists of a set of prediction modes. Given the left and above reconstructed (reference) samples, each of the signaled prediction modes corresponds to a prediction function that generates a different prediction signal.

With both conventional and LWIP modes available, the encoder compares the rate-distortion cost of conventional and LWIP modes and decides for the mode with lowest overall cost. The selected prediction mode is then sent to the decoder in the bitstream and it is used to select the corresponding prediction function for predicting the block. Signaling the prediction mode has the following syntax: First, a flag is sent that indicates whether the block is predicted with a conventional or a LWIP mode. If conventional prediction is chosen, a conventional prediction mode is read from the bitstream according to the intra prediction signaling. Otherwise, if LWIP prediction is selected, the flag is followed by sending a mode index within the set of available LWIP modes. Since both conventional and LWIP modes are available for all block sizes that are generally supported by the codec for intra prediction, the flag has to be sent for every block.

The VVC coding standard currently supports intra prediction for luma block sizes in the range W×H={4, 8, 16, 32, 64}×{4, 8, 16, 32, 64}. Obviously, the encoder search with rate-distortion optimization (RDO) can become very complex, as the rate-distortion costs of all the different block sizes (resulting from splitting larger blocks into smaller blocks) are evaluated for all the different prediction modes. For reducing the encoder complexity, optimizations typically reduce the number of combinations that are tested, excluding cases that are statistically unlikely to lead to the lowest rate-distortion cost.

The core prediction of LWIP only supports square blocks with $W_{LWIP}=H_{LWIP} \in \{4, 8, 16\}$. For enabling LWIP prediction for all the other block sizes, the reference samples are downsampled to match the core prediction size and the output is upsampled to match the block size. This has the effect that the prediction quality is reduced for block shapes with highly unequal down- and upsampling ratios for the horizontal and vertical direction. This means that for blocks with an aspect ratio larger than 2, $$\text{i.e. } \frac{W}{H} > 2 \text{ or } \frac{H}{W} > 2,$$

it is less nicely that an LWIP mode leads to a lower rate-distortion cost than a conventional prediction mode.

This effect can be used to reduce the encoder complexity by restricting LWIP modes to blocks with aspect ratios smaller than or equal to 2 and not testing them for blocks with a higher aspect ratio. However, this also results in a somewhat lower coding efficiency. Not sending the flag for blocks with an aspect ratio larger than 2 would reduce the loss in coding efficiency, but would also make it impossible to realize an encoder that achieves a better overall coding efficiency by testing LWIP modes for blocks with an aspect ratio larger than 2, which might be useful for different applications.

The solution to support both fast and highly-compression-efficient encoders is introducing an individual, additional CABAC context for sending the flag for blocks with an aspect ratio larger than 2. Now, in case LWIP modes are not tested at the encoder for those blocks, the flag is typically 0 (=block not predicted with an LWIP mode) and sending the flag causes almost no overhead (only for adapting the context towards a zero probability for sending a 1), meaning that the coding efficiency is very close to the solution of not sending the flag for those blocks. In case LWIP blocks are tested at the encoder for those blocks, the flag is 1 (=block is predicted with an LWIP mode) with a certain probability and sending the flag causes almost no overhead, meaning that the coding efficiency is very close to the solution of sending the flag with the same context for all block sizes.

In other words, as mentioned above, in accordance with embodiments, the inventive approach uses four contexts or context models for the binarization of a syntax element intra_mip_flag representing an affine linear weighted intra prediction, LWIP, or matrix-based intra prediction, MIP, of the versatile video coding, VVC, standard. The selection index is controlled the aspect ratio (width/height or height/width) of a current block:

0|otherwise,
1|otherwise,
SelectionIndex=2|otherwise,
3|if an aspect ratio of a current block is larger than 2

Figure 3:
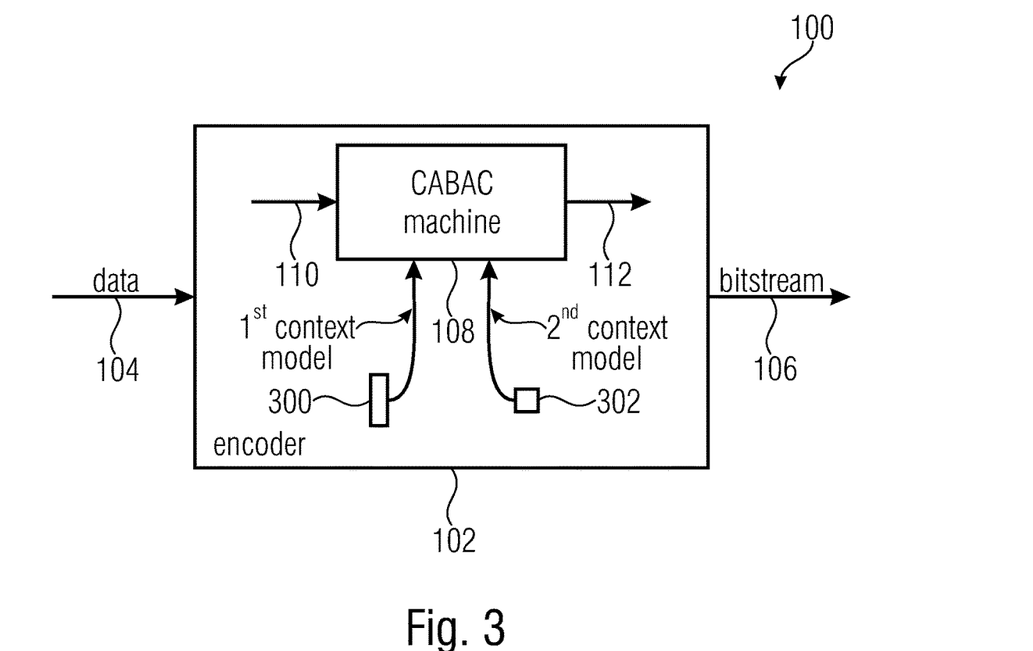
FIG. 3 illustrates an apparatus for encoding image or video data in accordance with embodiments of the present invention introducing an individual, additional CABAC context for sending a flag for blocks with an aspect ratio larger than 2.

FIG. 3 illustrates an apparatus, e.g., an apparatus similar to the one of FIG. 1, for encoding image or video data in accordance with embodiments of the present invention introducing an individual, additional CABAC context for sending a flag for blocks with an aspect ratio larger than 2. The encoder 102 receives the image or video data 104 and encodes the received image or video data 104 so as to provide the bitstream 106 representing the encoded image or video data. The CABAC encoder 108 receives the tool flag 110 indicating whether or not certain coding tool, like the affine linear weighted intra prediction, LWIP, is employed when encoding a block of the image or video data. The affine linear weighted intra prediction, LWIP, is also referred to as matrix-based intra prediction, MIP, in the versatile video coding, VVC, standard, and the tool flag is also referred to as intra_mip_flag, indicating the applicability of the affine LWIP or MIP of the VVC standard.

For a block 300 of the image or video data having an aspect ratio larger than 2 and to which the certain coding tool is applicable, a first context model for encoding the tool flag is selected from a group of one or more first context models, and provided to the CABAC 108. For a block 302 of the image or video data having an aspect ratio less than or equal to 2 and to which the certain coding tool is applicable, a second context model for encoding the tool flag is selected from a group of one or more second context models, and provided to the CABAC 108. For example, in case LWIP modes are not tested for the block 300 with an aspect ratio larger than 2, the flag is typically 0 and the additional CABAC context adapts towards a zero probability for sending a 1, while in case LWIP modes are tested for the block 300 with an aspect ratio larger than 2, the flag is 1 with a certain probability. In accordance with embodiments, the CABAC encoder 108 may select the first context model and the second context model for a currently processed block responsive to a selection index. The selection index indicates that a currently processed block has an aspect ratio larger than 2 or has an aspect ratio less than or equal to 2.

Figure 4:
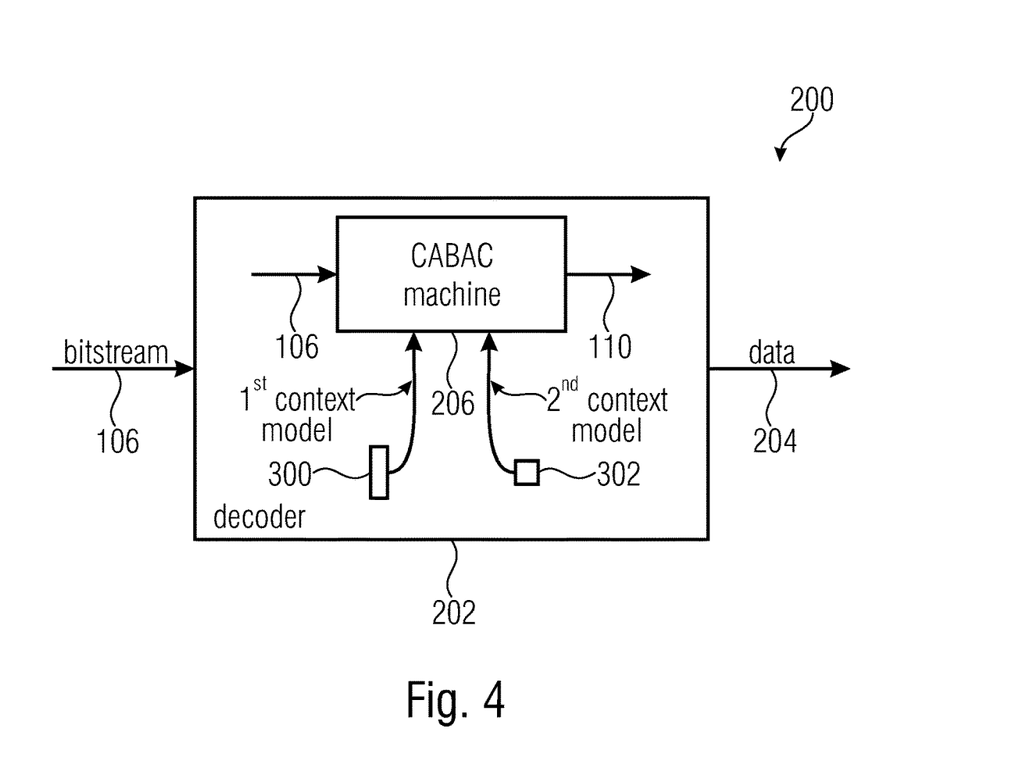
FIG. 4 illustrates an apparatus for decoding image or video data in accordance with embodiments of the present invention introducing the individual, additional CABAC context for a flag for blocks with an aspect ratio larger than 2 and encoded using the apparatus of FIG. 3.

FIG. 4 illustrates an apparatus, e.g., an apparatus 100 similar to the one of FIG. 2, for decoding image or video data in accordance with embodiments of the present invention introducing the individual, additional CABAC context for a flag for blocks with an aspect ratio larger than 2 and encoded using the apparatus of FIG. 3. For a block 300 of the image or video data having an aspect ratio larger than 2 and to which the certain coding tool is applicable, a first context model for encoding the tool flag is selected from a group of one or more first context models, and provided to the CABAC 206. For a block 302 of the image or video data having an aspect ratio less than or equal to 2 and to which the certain coding tool is applicable, a second context model for encoding the tool flag is selected from a group of one or more second context models, and provided to the CABAC 206.

For example, the binarization of syntax element intra_mip_flag may employ a total of four context models with context index {0, 1, 2, 3} as follows:
  if the aspect ratio (width/height or height/width) of the current block is larger than 2, use the context model with index 3, otherwise use one of the context models 0, 1, 2, wherein the selection may depend on the intra_mip_flag of blocks left and above of the current block, as is, for example, known and used for several other syntax elements.

In the VVC specification the coding unit syntax may be as follows (see for example 7.3.10.5 of [5]—Coding unit syntax):

```
...
    if( sps_mip_enabled_flag )
        intra_mip_flag[ x0 ][ y0 ]                ae (v)
    if( intra_mip_flag[ x0 ][ y0 ] ) {
        intra_mip_transposed[ x0 ][ y0 ]          ae (v)
        intra_mip_mode[ x0 ][ y0 ]                ae (v)
    } else
        ...
``` intra_mip_flag[x0][y0] equal to 1 specifies that the intra prediction type for luma samples is matrix-based intra prediction. intra_mip_flag[x0][y0] equal to 0 specifies that the intra prediction type for luma samples is not matrix-based intra prediction (see for example 7.4.11.5 of [5]—Coding unit semantics).

The binarization of syntax element intra_mip_flag may be as follows (see for example 9.3.4.2 of [5]—Derivation process for ctxTable, ctxIdx and bypassFlag):

| | binIdx | | | | | |
|---|---|---|---|---|---|---|
| Syntax element | 0 | 1 | 2 | 3 | 4 | >=5 |
| ... | | | | | | |
| intra_mip_flag[ ][ ] | (Abs(Log2(cbWidth)-Log2(cbHeight)) > 1)? 3: (0, 1, 2 (clause 9.3.4.2.2)) | na | na | na | na | na |

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 5:
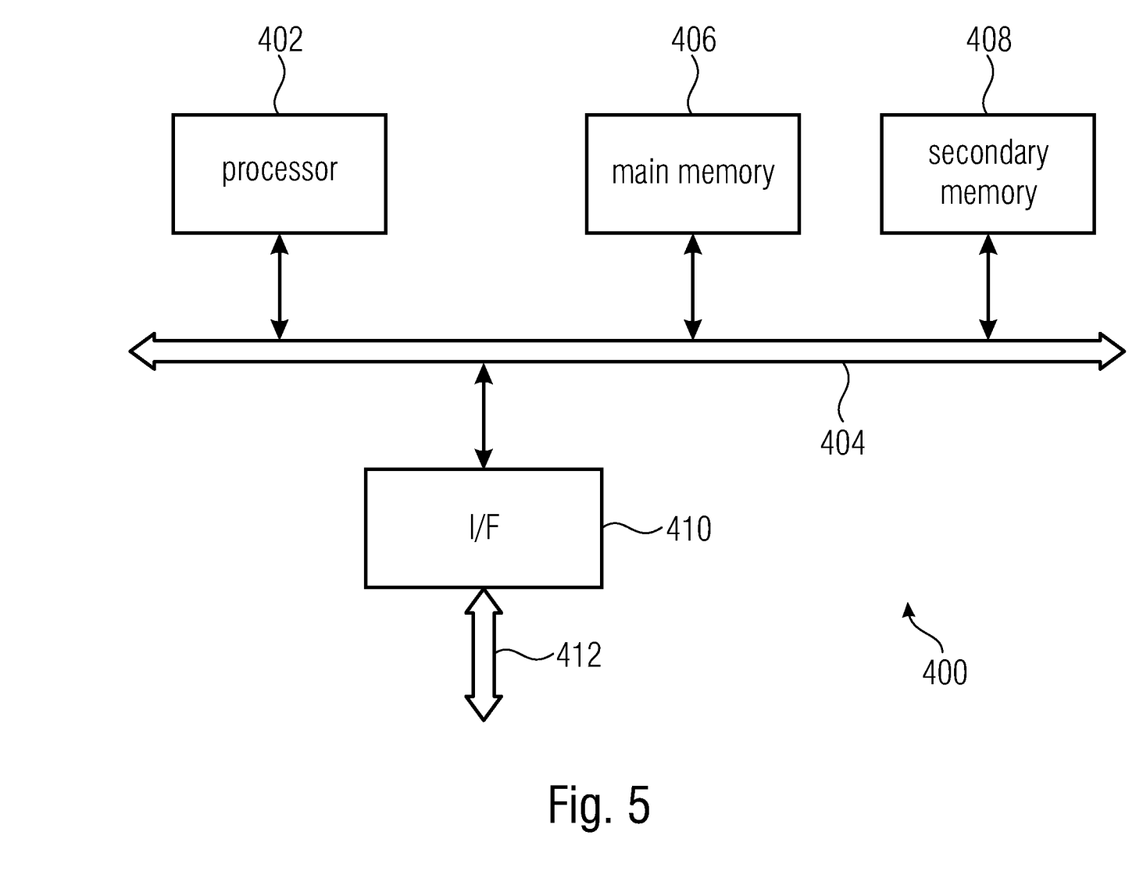
FIG. 5 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 5 illustrates an example of a computer system 400. The units or modules as well as the steps of the methods performed by these units may execute on one or more computer systems 400. The computer system 400 includes one or more processors 402, like a special purpose or a general purpose digital signal processor. The processor 402 is connected to a communication infrastructure 404, like a bus or a network. The computer system 400 includes a main memory 406, e.g., a random access memory (RAM), and a secondary memory 408, e.g., a hard disk drive and/or a removable storage drive. The secondary memory 408 may allow computer programs or other instructions to be loaded into the computer system 400. The computer system 400 may further include a communications interface 410 to allow software and data to be transferred between computer system 400 and external devices. The communication may be in the from electronic, electromagnetic, optical, or other signals capable of being handled by a communications interface. The communication may use a wire or a cable, fiber optics, a phone line, a cellular phone link, an RF link and other communications channels 412.

The terms "computer program medium" and "computer readable medium" are used to generally refer to tangible storage media such as removable storage units or a hard disk installed in a hard disk drive. These computer program products are means for providing software to the computer system 400. The computer programs, also referred to as computer control logic, are stored in main memory 406 and/or secondary memory 408. Computer programs may also be received via the communications interface 410. The computer program, when executed, enables the computer system 400 to implement the present invention. In particular, the computer program, when executed, enables processor 402 to implement the processes of the present invention, such as any of the methods described herein. Accordingly, such a computer program may represent a controller of the computer system 400. Where the disclosure is implemented using software, the software may be stored in a computer program product and loaded into computer system 400 using a removable storage drive, an interface, like communications interface 410.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC, ITU-T. High efficiency video coding. ITU-T Recommendation H.265|ISO/IEC 23008 10 (HEVC), edition 1, 2013; edition 2, 2014.
[2] JEM reference software, https://jvet.hhi.fraunhofer.de/svn/svn_HMJEMSoftware/.
[3] B. Bross, J. Chen, Shan Liu, "*Versatile Video Coding (Draft 4)*", JVET-M1001-v5, February 2019, Marrakesh, Morocco
[4] J. Pfaff, B. Stallenberger, M. Schäfer, P. Merkle, P. Helle, R. Rische, H. Schwarz, D. Marpe, T. Wiegand, "*Affine Linear Weighted Intra Prediction*", JVET-M0043, February 2019, Marrakesh, Morocco
[5] B. Bross, J. Chen, Shan Liu, "*Versatile Video Coding (Draft 8)*", JVET-Q2001-vD, February 2020, Brussels, Belgium

The invention claimed is:

1. An encoding apparatus, comprising:
an encoder including a context adaptive binary arithmetic coding (CABAC) encoder, the encoder configured to:
receive data representing at least one image,
encode the data, and
provide a bitstream representing the encoded data;
wherein, the CABAC encoder is configured to:
determine whether an aspect ratio of a block of an image, of the at least one image, is larger than two,
select a context model based on the determination, wherein:
in response to the determination that the aspect ratio is larger than two, the selected context model is a first context model from a first group of at least one context model, and
in response to the determination that the aspect ratio is not larger than two, the selected context model is a second context model from a second group of at least one context model, wherein context models included in the second group are different than context models included in the first group; and
encode, using the selected context model, a binary valued syntax element into coded bits for the bitstream, the binary valued syntax element indicating whether a linear weighted intra prediction (LWIP) coding tool is employed when encoding the block.

2. The encoding apparatus of claim 1, wherein the CABAC encoder is further configured to:
select the first context model or the second context model for encoding the binary valued syntax element responsive to a selection index, the selection index indicating that the aspect ratio is larger than two or that the aspect ratio is not larger than two.

3. The encoding apparatus of claim 1, wherein:
to encode the received data the encoder is configured to perform matrix-based intra prediction (MIP), and
the CABAC encoder is configured to encode the binary valued syntax element to indicate that the LWIP coding tool is employed to encoding the block.

4. The encoding apparatus of claim 1, wherein:
to encode the received data the encoder is configured to perform DC, angular, or planar intra prediction, and
the CABAC encoder is configured to encode the binary valued syntax element to indicate that the LWIP coding tool is not employed to encoding the block.

5. A decoding apparatus, comprising:
a decoder including a context adaptive binary arithmetic coding (CABAC) decoder, the decoder configured to:
receive a bitstream comprising encoded data representing at least one image, and
decode, from the received bitstream, the encoded data;
wherein the CABAC decoder is configured to:
determine whether an aspect ratio of a block of an image, of the at least one image, is larger than two,
select a context model based on the determination, wherein:
in response to the determination that the aspect ratio is larger than two, the selected context model is a first context model from a first group of at least one context model, and
in response to the determination that the aspect ratio is not larger than two, the selected context model is a second context model from a second group of at least one context model, wherein context models included in the second group are different than context models included in the first group; and
decode from the bitstream, using a selected context model, a binary valued syntax element associated with the block of the image from the encoded data, the binary valued syntax element indicating whether a linear weighted intra prediction (LWIP) coding tool is employed when encoding the block.

6. The decoding apparatus of claim 5, wherein:
to decode the data the decoder is configured to perform matrix-based intra prediction (MIP), and
the CABAC decoder is configured to decode the binary valued syntax element that indicates that the LWIP coding tool is employed to encoding the block.

7. The decoding apparatus of claim 5, wherein:
to decode the data the decoder is configured to perform DC, angular, or planar intra prediction, and
the CABAC decoder is configured to decode the binary valued syntax element that indicates that the LWIP coding tool is not employed to encoding the block.

8. The decoding apparatus of claim 5, wherein the decoder is further configured to provide the decoded data.

9. A method for encoding image or video data, the method comprising:
receiving data representing at least one image,
encoding, using a context adaptive binary arithmetic coding (CABAC) encoder, the received data, and
providing a bitstream representing the encoded data, wherein encoding the received data comprises:
determining whether an aspect ratio of a block of an image, of the at least one image, is larger than two,
select a context model based on the determination,
wherein in response to the determination that the aspect ratio is larger than two, the selected context model is a first context model from a first group of at least one first context models, and
in response to the determination that the aspect ratio is not larger than two, the selected context model is a second context model from a second group of at least one context model, where context models included in the second group are different than context models included in the first group; and
encoding, using the selected context model, a binary valued syntax element into coded bits for the bitstream, the binary valued syntax element indicating whether a linear weighted intra prediction (LWIP) coding tool is employed when encoding the block.

10. The method of claim 9, wherein:
encoding the received data comprises performing matrix-based intra prediction (MIP), and
encoding the binary valued syntax element to indicate that the LWIP coding tool is employed to encoding the block.

11. The method of claim 9, wherein:
encoding the received data the encoder is configured to perform DC, angular, or planar intra prediction, and
encoding the binary valued syntax element to indicate that the LWIP coding tool is not employed to encoding the block.

12. A decoding method comprising:
receiving a bitstream comprising encoded data, representing at least one image;
decoding, from the received bitstream, the encoded data;
determining whether an aspect ratio of a block of an image, of the at least one image, is larger than two;
selecting a context model based on the determination, wherein:
in response to the determination that the aspect ratio is larger than two, the selected context model is a first context model from a first group of at least one context model, and
in response to the determination that the aspect ratio is not larger than two, the selected context model is a second context model from a second group of at least one context model, wherein context models included in the second group are different than context models included in the first group; and
decoding from the bitstream, using a selected context model, a binary valued syntax element associated with the block of the image from the encoded data, the binary valued syntax element indicating whether a linear weighted intra prediction (LWIP) coding tool is employed when encoding the block.

13. The method of claim 12, wherein:
decoding the data comprises performing matrix-based intra prediction (MIP), and
the binary valued syntax element indicates that the LWIP coding tool is employed for decoding the block.

14. The method of claim 12, wherein:
decoding the data comprises performing DC, angular, or planar intra prediction, and
the binary valued syntax element that indicates that the LWIP coding tool is not employed for decoding the block.

15. The method of claim 12, further comprising providing the decoded data.

16. A non-transitory digital storage medium having a computer program stored thereon to perform a method for encoding data, said method comprising:
receiving data representing at least one image,
encoding, using a context adaptive binary arithmetic coding (CABAC) encoder, the received data, and
providing a bitstream representing the encoded data,
wherein encoding the received data comprises:
determining whether an aspect ratio of a block of an image, of the at least one image, is larger than two,
select a context model based on the determination,
wherein in response to the determination that the aspect ratio is larger than two, the selected context model is a first context model from a first group of at least one first context models, and
in response to the determination that the aspect is not larger than two, the selected context model is a second context model from a second group of at least one second context model, where context models included in the second group are different than context models included in the first group, and
encoding, using the selected context model, a binary valued syntax element into coded bits for the bitstream, the binary valued syntax element indicating whether a linear weighted intra prediction (LWIP) coding tool is employed when encoding the block,
when said computer program is run by a computer.

17. A non-transitory digital storage medium having a computer program stored thereon to perform a method for decoding image or video data, said method comprising:
receiving a bitstream comprising encoded data representing at least one image,
decoding, from the received bitstream, the encoded, data, and
determining whether an aspect ratio of a block of an image, of the at least one image, is larger than two;
selecting a context model based on the determination, wherein:
in response to the determination that the aspect ratio is larger than two, the selected context model is a first context model from a first group of at least one context model, and
in response to the determination that the aspect ratio is not larger than two, the selected context model is a second context model from a second group of at least context model, where context models included in the second group are different than context models included in the first group; and
decoding from the bitstream, using a selected context model, a binary valued syntax element associated with the block of the image from the encoded data, the binary valued syntax element indicating whether a linear weighted intra prediction (LWIP) coding tool is employed when encoding the block,
when said computer program is run by a computer.

* * * * *